(12) United States Patent
Chen et al.

(10) Patent No.: US 10,849,112 B2
(45) Date of Patent: Nov. 24, 2020

(54) PROCESSING PMCH AND EPDCCH IN LTE

(71) Applicant: QUALCOMM Incorporated, San Diego, CA (US)

(72) Inventors: Wanshi Chen, San Diego, CA (US); Hao Xu, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 13/789,499

(22) Filed: Mar. 7, 2013

(65) Prior Publication Data

US 2014/0098732 A1 Apr. 10, 2014

Related U.S. Application Data

(60) Provisional application No. 61/709,932, filed on Oct. 4, 2012.

(51) Int. Cl.
*H04W 72/04* (2009.01)
*H04L 5/00* (2006.01)

(52) U.S. Cl.
CPC ......... *H04W 72/042* (2013.01); *H04L 5/0092* (2013.01); *H04L 5/001* (2013.01); *H04L 5/0023* (2013.01); *H04L 5/0028* (2013.01); *H04L 5/0053* (2013.01); *H04L 5/0082* (2013.01)

(58) Field of Classification Search
CPC ........ H04W 4/06; H04W 72/04; H04W 88/02
USPC ........................................................ 370/312
See application file for complete search history.

(56) References Cited

U.S. PATENT DOCUMENTS

| | | | |
|---|---|---|---|
| 2009/0088148 A1 | 4/2009 | Chung et al. | |
| 2011/0205978 A1 | 8/2011 | Nory et al. | |
| 2011/0317610 A1 | 12/2011 | Park et al. | |
| 2012/0127910 A1 | 5/2012 | Li | |
| 2012/0155416 A1* | 6/2012 | Zhang | H04W 72/04 370/329 |
| 2012/0176884 A1 | 7/2012 | Zhang et al. | |
| 2012/0257562 A1* | 10/2012 | Kim | H04W 4/06 370/312 |
| 2013/0039284 A1* | 2/2013 | Marinier et al. | 370/329 |

(Continued)

FOREIGN PATENT DOCUMENTS

| | | |
|---|---|---|
| CA | 2786804 A1 | 7/2011 |
| CN | 101577563 A | 11/2009 |

OTHER PUBLICATIONS (3GPP TSG RAN WG1 Meeting #69;R1-122756 ;Prague, Czech Republic, May 21-25, 2012; Source: Alcatel-Lucent Shanghai Bell, Alcatel-Lucent ; Title: ePDCCH in MBSFN subframes).*

(Continued)

*Primary Examiner* — Kodzovi Acolatse
*Assistant Examiner* — Abdeltif Ajid
(74) *Attorney, Agent, or Firm* — Liem T. Do

(57) ABSTRACT

Methods and apparatuses are provided for resolving collisions between a multicast channel (such as a physical multicast channel (PMCH)) and a control channel (such as an enhanced physical downlink control channel (EPDDCH)) in a wireless network, such as LTE. In an aspect, a UE determines whether to process an enhanced physical downlink control channel (EPDCCH) or a signal of a service in a subframe. The UE communicates in accordance with the determination.

28 Claims, 9 Drawing Sheets

(56) References Cited

U.S. PATENT DOCUMENTS

| | | | | |
|---|---|---|---|---|
| 2013/0242904 A1* | 9/2013 | Sartori | ............... | H04L 5/0053 370/329 |
| 2013/0250882 A1* | 9/2013 | Dinan | ............... | H04L 5/0032 370/329 |
| 2013/0252606 A1* | 9/2013 | Nimbalker | ........... | H04B 17/309 455/434 |
| 2014/0086135 A1* | 3/2014 | Wong | ................ | H04L 5/0094 370/312 |

OTHER PUBLICATIONS (3GPP TSG-RAN WG1 #70;R1-123254 ;Qingdao, P.R.China, Aug. 13-17, 2012;Agenda item:7.6.8;Source:NEC Group; Title: ePDCCH and PMCH).*

(3GPP TSG RAN WG1 Meeting #69 Prague, Czech Repubic, May 21-25, 2012; Source: Alcatel-Lucent Shanghai Bell, Alcatel-Lucent; Title: ePDCCH in MBSFN subframes ;Agenda Item: 7.6.5).*

(3GPP TSG-RAN WG1 #70;R1-123254 ;Qingdao, P.R.China, Aug. 13-17, 2012;Agenda item:7.6.8;Source:NEC Group; Title: ePDCCH and PMCH) (Year: 2012).*

(3GPP TSG RAN WG1 Meeting #69 Prague, Czech Repubic, May 21-25, 2012; Source: Alcatel-Lucent Shanghai Bell, Alcatel-Lucent; Title: ePDCCH in MBSFN subframes ;Agenda Item: 7.6.5) (Year: 2012).*

Ericsson, et al., "ePDCCH Subframe Configuration", 3GPP TSG-RAN WG1 #70bis, Sep. 29, 2012, 2 Pages, R1-124153, http://www.3gpp.org/ftp/tsg_ran/WG1_RL1/TSGR1_70b/Docs/R1-124153.zip.

International Search Report and Written Opinion—PCT/US2013/061720—ISA/EPO—Jun. 4, 2014.

Alcatel-Lucent, et al., "Configuration of subframes for monitoring EPDCCH", 3GPP Draft, R1-124420—REL-11 EPDCCH—EPDCCH Subframe Indication—Final, 3rd Generation Partnership Project (3GPP), Mobile Competence Centre, 650, Route Des Lucioles, F-06921 Sophia-Antipolis CEO vol. RAN WG1, No. San Diego, USA, Oct. 8, 2012-Oct. 12, 2012, pp. 1-4, Sep. 29, 2012 (Sep. 29, 2012), XP050662312, Retrieved from the Internet—URL:http://www.3gpp.org/ftp/tsg_ran/WG1_RL 1/TSGR_70b/Docs/ [retrieved on Sep. 29, 2012).

NEC Group: "ePDCCH and PMCH", 3GPP Draft, R1-123254 EPDCCH and PMCH, 3rd Generation Partnership Project (3GPP), Mobile Competence Centre, 650, Route Des Lucioles, Sophia-Antipolis Cedex, France vol. RAN WG1, No. Qingdao, Aug. 13, 2012-Aug. 17, 2012, pp. 1-4, Aug. 5, 2012 (Aug. 5, 2012), XP050661144, Retrieved from the Internet—URL:http://www.3gpp.org/ftp/tsg_ran/WG1_RL 1 /TSGR1_70/Docs/ [retrieved on Aug. 5, 2012].

Qualcomm Incorporated: "Configurations of Subframes for Monitoring ePDCCH", 3GPP Draft, R1-124450 Configuration of EPDCCH Subframes, 3rd Generation Partnership Project (3GPP), Mobile Competence Centre, 650, Route Des Lucioles, F-06921 Sophia-Antipolis Cedex, France vol. RAN WG1, No. San Diego, CA, USA, Oct. 8, 2012-Oct. 12, 2012 pp. 1-4, Sep. 29, 2012 (Sep. 29, 2012), XP050662341 Retrieved from the Internet—URL:http:www.3gpp.org/ftp/tsg_ran/WG1_RL 1 /TSGR 1_70b/Docs/ [retrieved on Sep. 29, 2012).

* cited by examiner

PROCESSING PMCH AND EPDCCH IN LTE

CROSS-REFERENCE TO RELATED APPLICATION

This application claims the benefit under 35 U.S.C. § 119(e) to U.S. Provisional Patent Application No. 61/709,932 entitled "PROCESSING PMCH AND EPDCCH IN LTE," filed on Oct. 4, 2012, the disclosure of which is expressly incorporated by reference herein in its entirety.

BACKGROUND

Field

Aspects of the present disclosure relate generally to wireless communication systems, and more particularly to resolving collisions between a multicast channel (such as a physical multicast channel (PMCH)) and a control channel (such as an enhanced physical downlink control channel (EPDDCH)) in a wireless network, such as LTE.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In one aspect, a method of wireless communication is disclosed. The method includes determining whether to process an enhanced physical downlink control channel (EPDCCH) or a signal of a service in a subframe. The UE then communicates in accordance with the determination.

Another aspect discloses wireless communication having a memory and at least one processor coupled to the memory. The processor(s) is configured to determine whether to process an enhanced physical downlink control channel (EPDCCH) or a signal of a service in a subframe. The processor(s) is also configured to communicate in accordance with the determination.

In another aspect, a computer program product for wireless communications in a wireless network having a non-transitory computer-readable medium is disclosed. The computer readable medium has non-transitory program code recorded thereon which, when executed by the processor(s), causes the processor(s) to perform operations of determining whether to process an enhanced physical downlink control channel (EPDCCH) or a signal of a service in a subframe. The program code also causes the processor(s) to communicate in accordance with the determination.

Another aspect discloses an apparatus including means for determining whether to process an enhanced physical downlink control channel (EPDCCH) or a signal of a service in a subframe. Also included is a mean for communicating in accordance with the determination.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
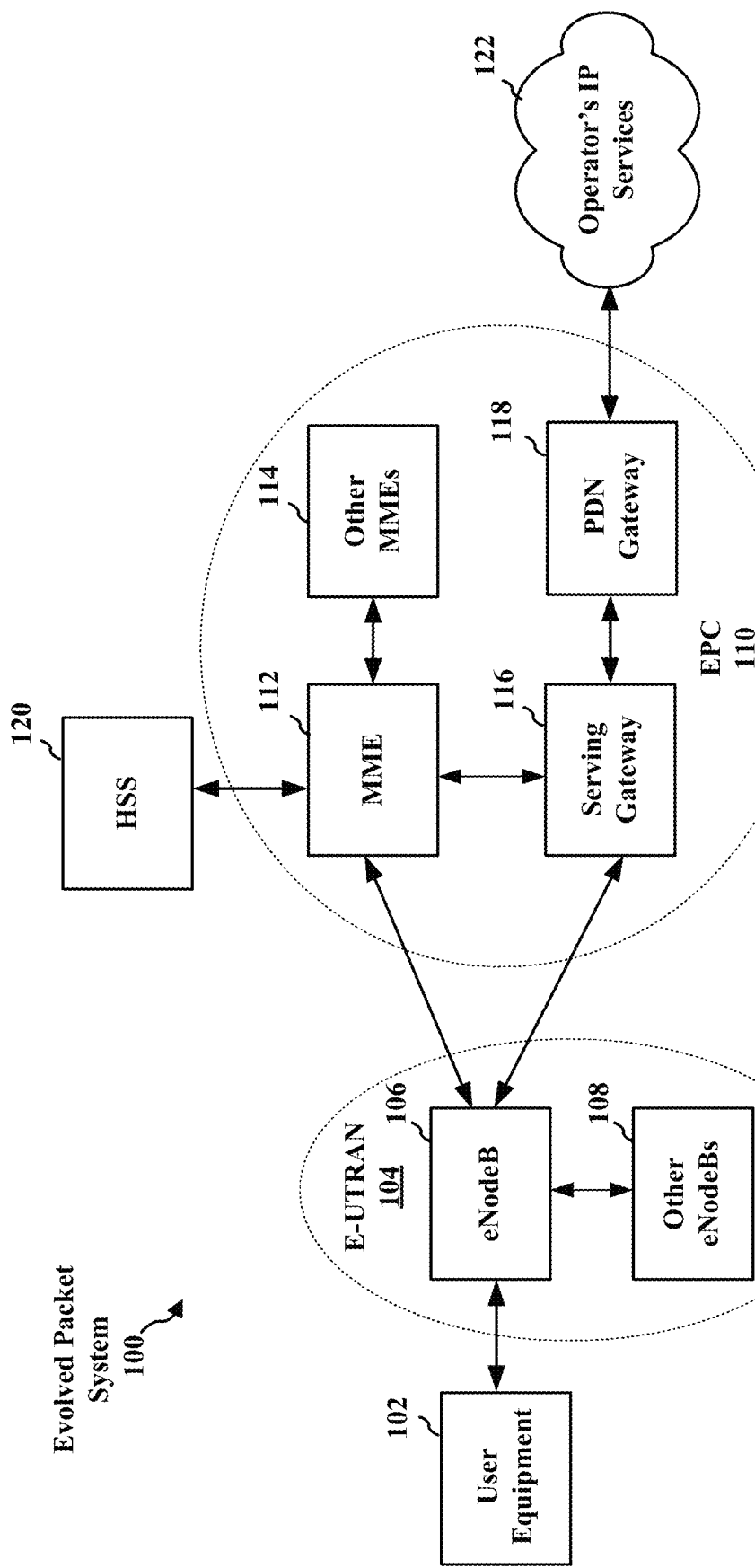
FIG. 1 is a diagram illustrating an example of a network architecture.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via an X2 interface (e.g., backhaul). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
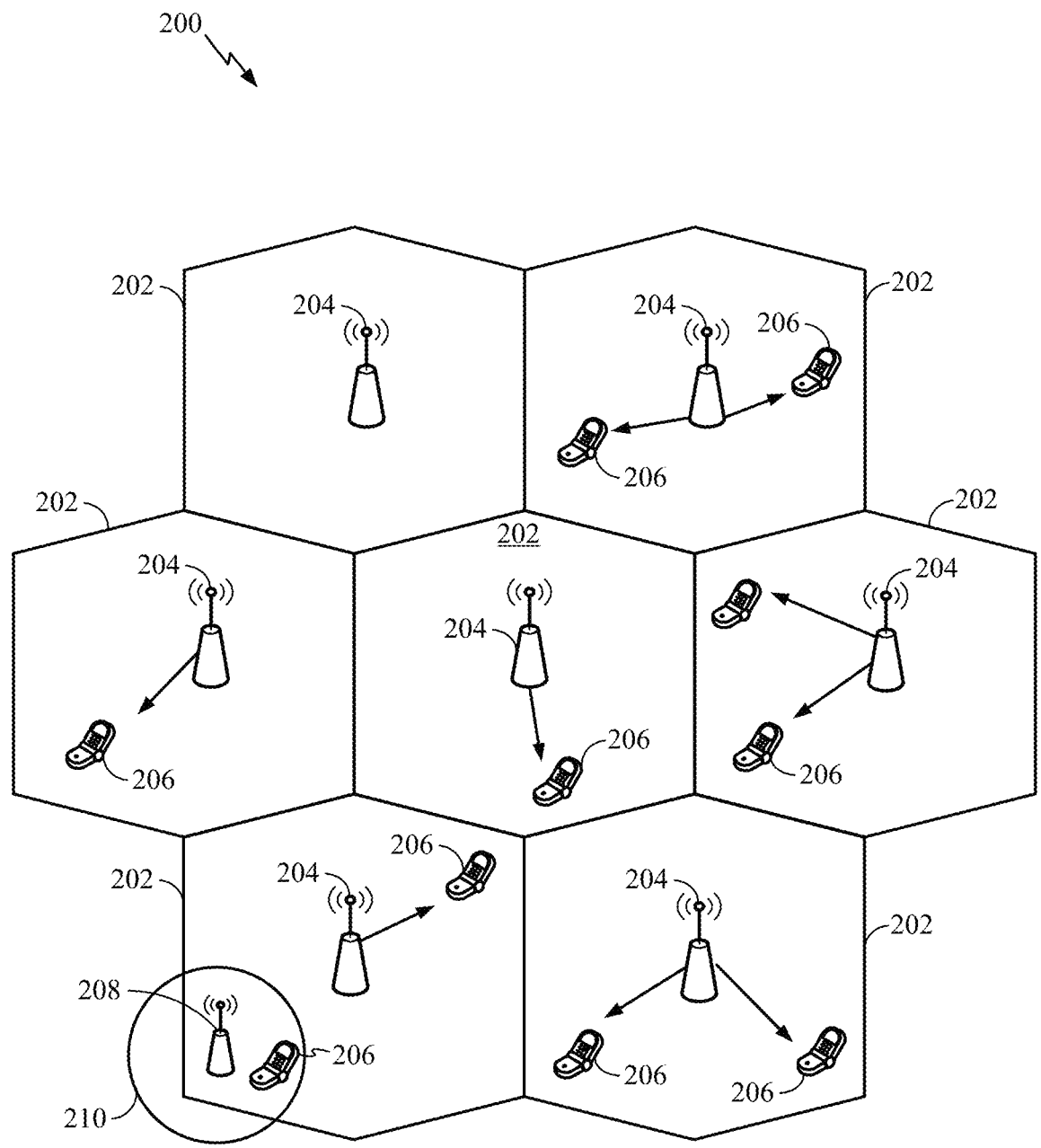
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. A lower power class eNodeB 208 may be referred to as a remote radio head (RRH). The lower power class eNodeB 208 may be a femto cell (e.g., home eNodeB (HeNodeB)), pico cell, or micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the uplink to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
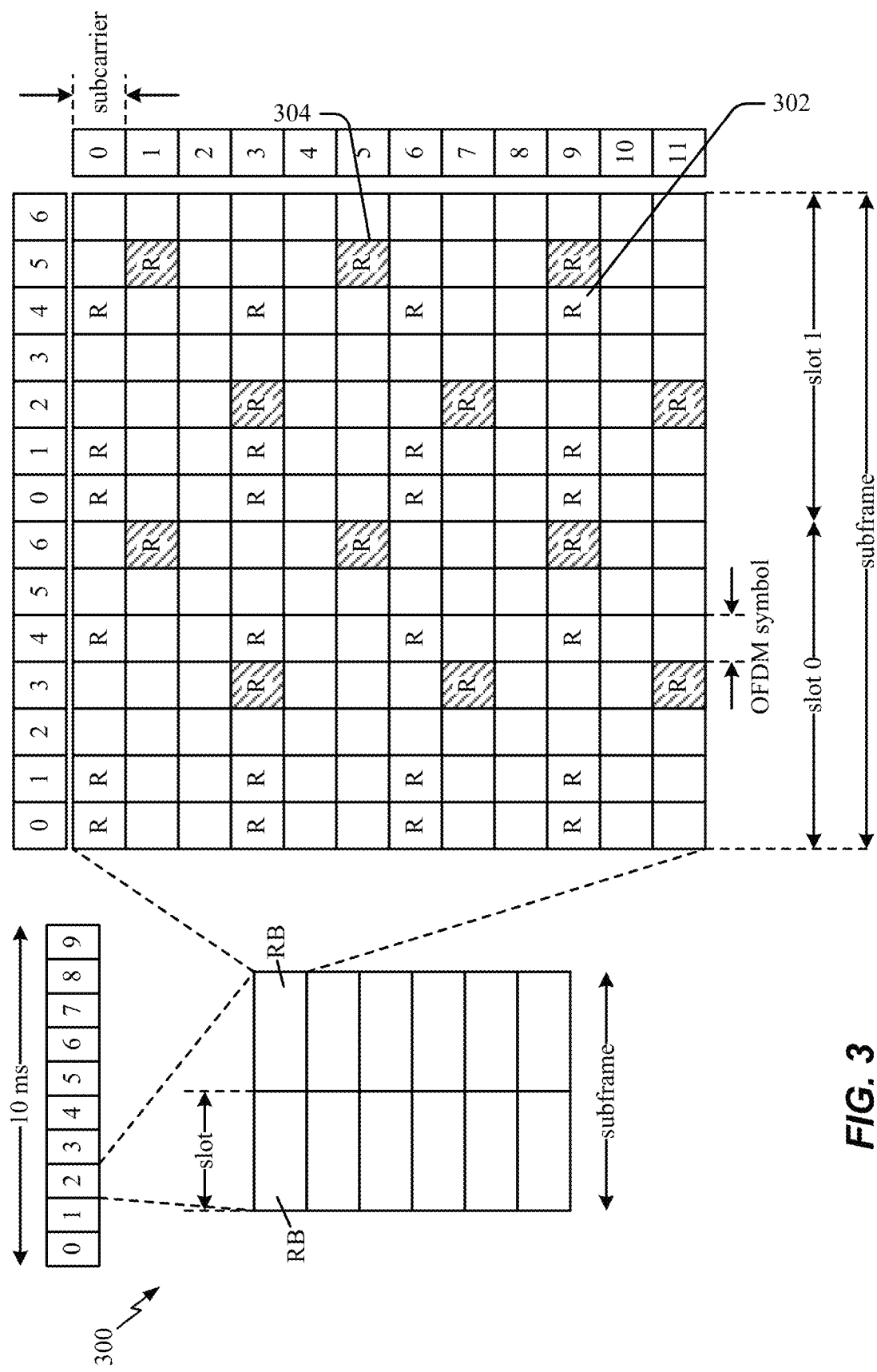
FIG. 3 is a diagram illustrating an example of a downlink frame structure in LTE.

FIG. 3 is a diagram 300 illustrating an example of a DL frame structure in LTE. A frame (10 ms) may be divided into 10 equally sized sub-frames. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
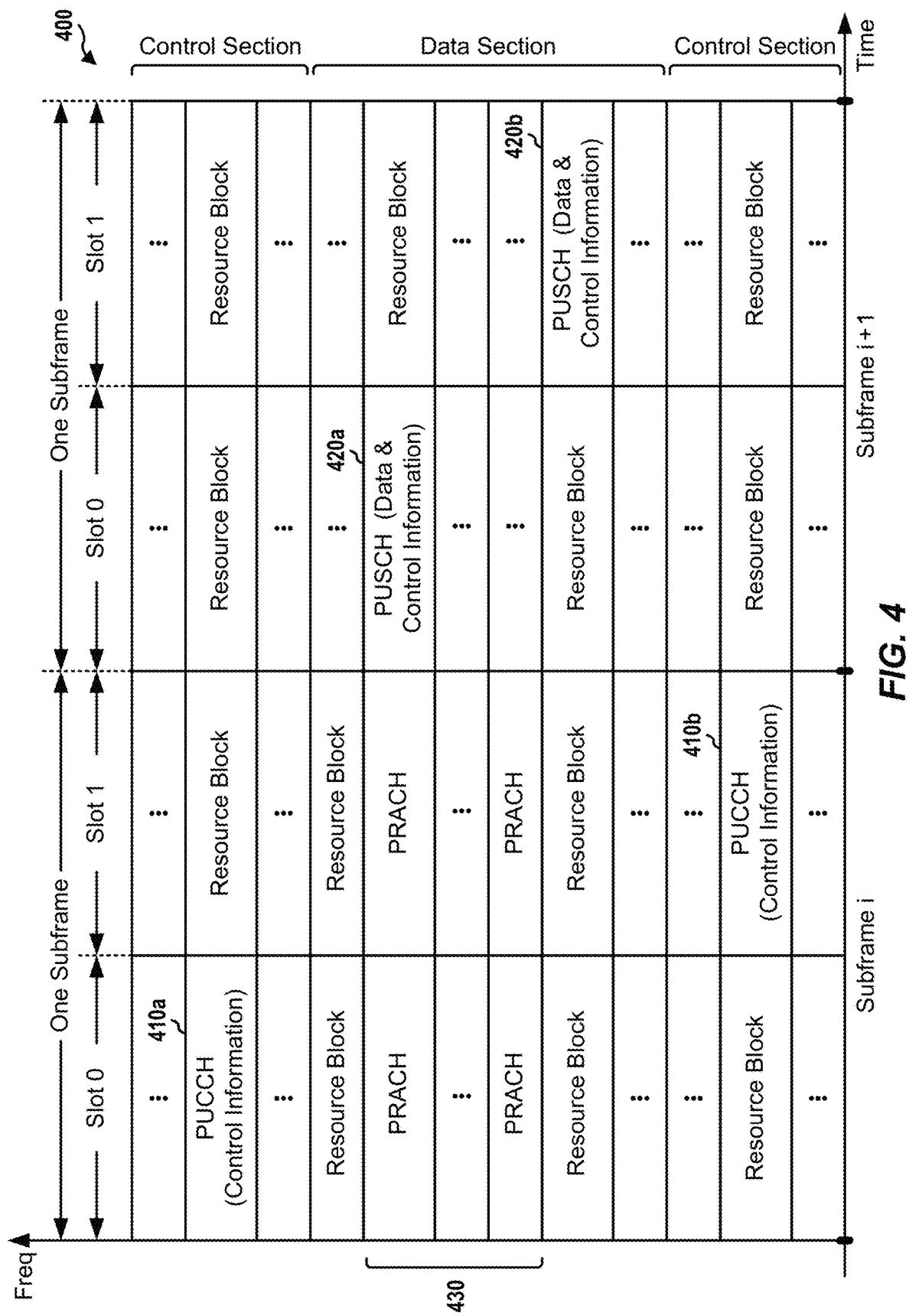
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410a, 410b in the control section to transmit control information to an eNodeB. The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. A uplink transmission may span both slots of a subframe and may hop across frequency.

A set of resource blocks may be used to perform initial system access and achieve uplink synchronization in a physical random access channel (PRACH) 430. The PRACH 430 carries a random sequence and cannot carry any uplink data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
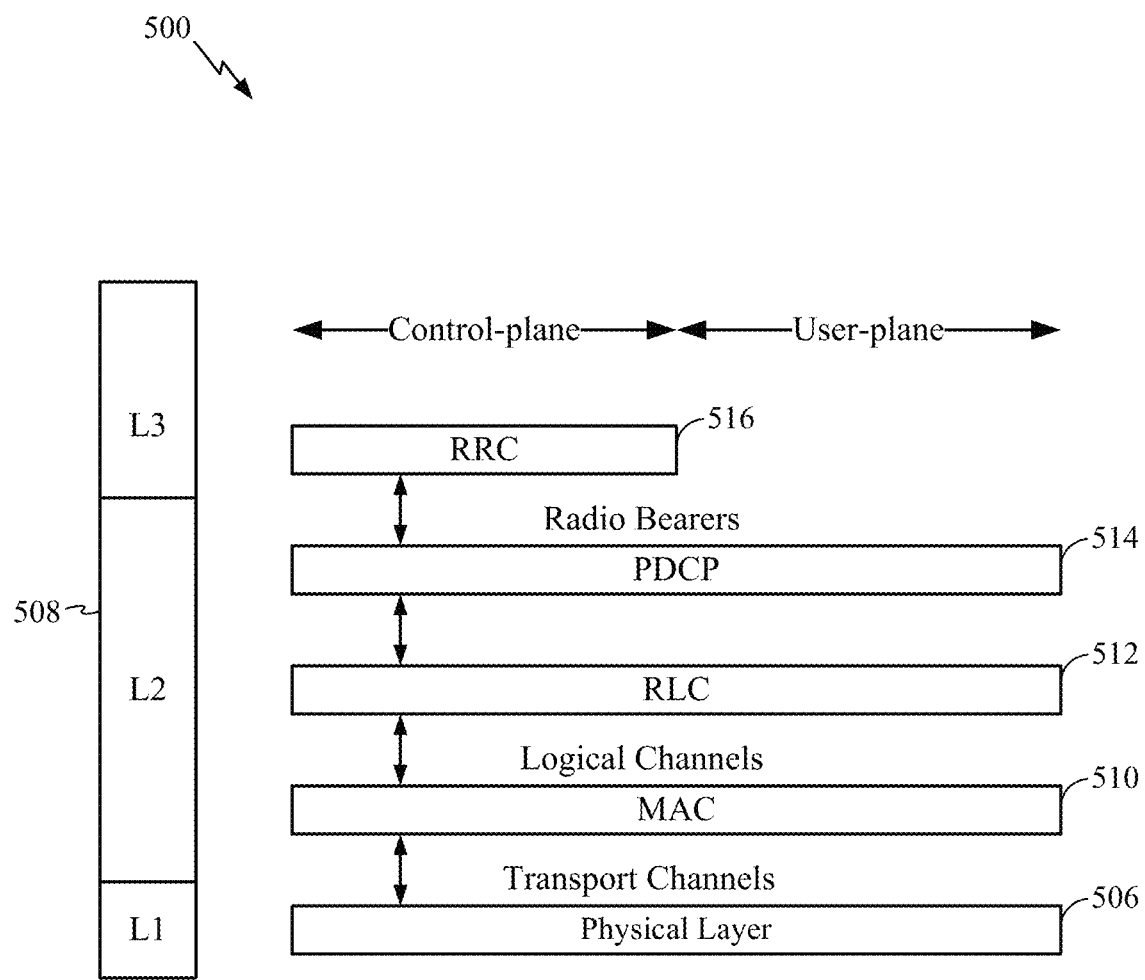
FIG. 5 is a diagram illustrating an example of a radio protocol architecture for the user and control plane.

FIG. 5 is a diagram 500 illustrating an example of a radio protocol architecture for the user and control planes in LTE.

The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
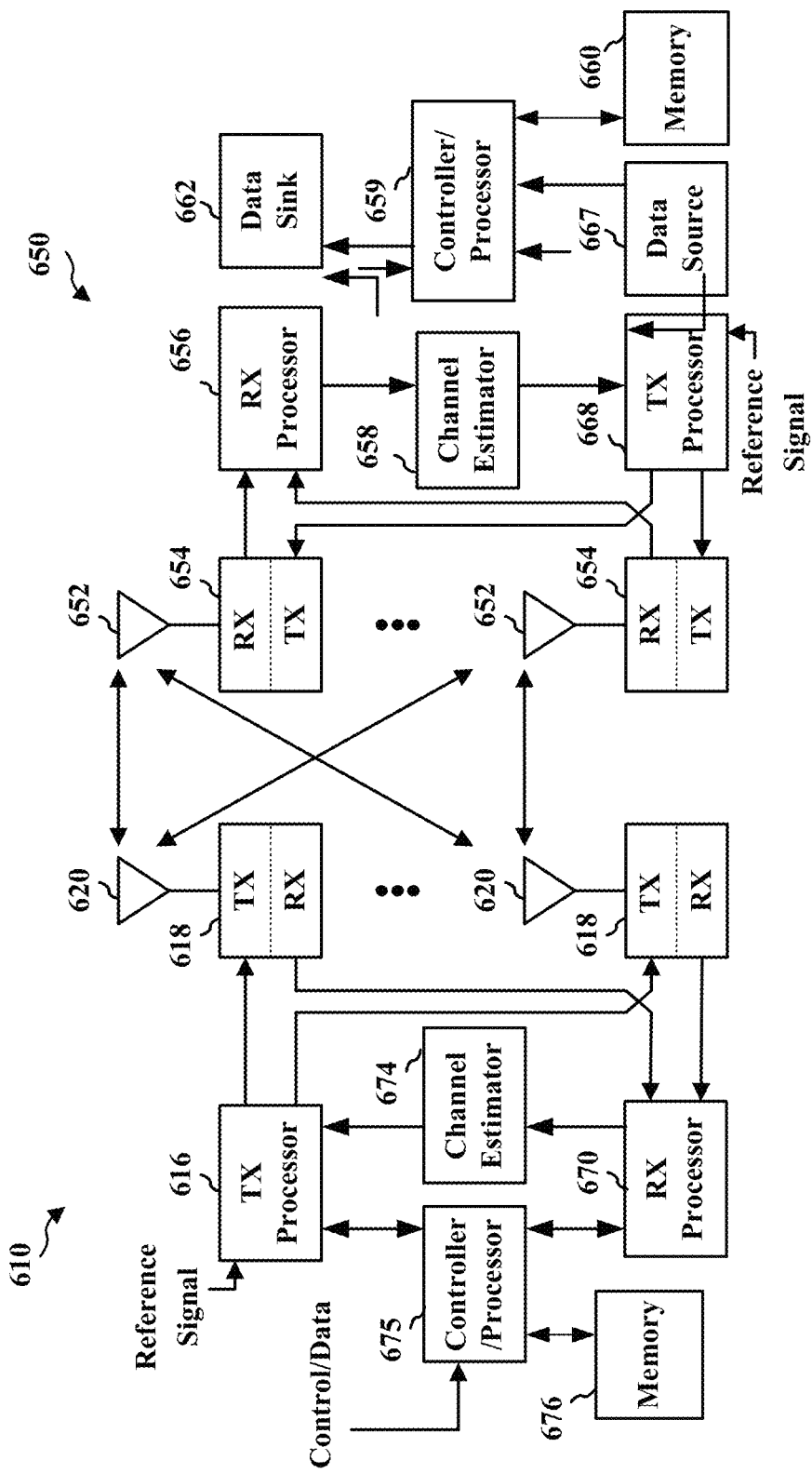
FIG. 6 is a diagram illustrating an example of an evolved Node B and user equipment in an access network.

FIG. 6 is a block diagram of an eNodeB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the uplink, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the uplink, a data source 667 is used to provide upper layer packets to the controller/processor 659. The data source 667 represents all protocol layers above the L2 layer. Similar to the functionality described in connection with the DL transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The uplink transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the uplink, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

In LTE Releases 8/9/10, the physical downlink control channel (PDCCH) is located within the first several symbols (e.g., one, two, three or four) in a subframe and is fully distributed across the entire system bandwidth. Additionally, the PDCCH is time domain multiplexed (TDM'ed) with the physical downlink shared channel PDSCH, which effectively divides a subframe into a control region and a data region.

In LTE Release 11, an enhanced control channel, such as the enhanced PDCCH (EPDCCH), is introduced. In contrast to a conventional control channel that occupies the first several control symbols in a subframe, the enhanced control channel may occupy the data region, similar to the shared channel (PDSCH). The enhanced control channel may increase control channel capacity, support frequency-domain inter-cell interference coordination (ICIC), improve spatial reuse of control channel resources, support beamforming and/or diversity, operate on the new carrier type and in multimedia broadcast over single frequency network (MBSFN) subframes, and coexist on the same carrier as conventional user equipments (UEs).

In LTE Release-8/9/10, each UE monitors a set of PDCCH decoding candidates. Generally, there are two sets: common (search space) and UE-specific (search space). The common search space (CSS) includes up to six (6) decoding candidates, such as 4 candidates for aggregation level 4 and 2 candidates for aggregation level 8. An aggregation level N is defined as N control channel elements (CCE). Each CCE has 36 resource elements (REs). The common search spaces are common to all UEs and are primarily used for broadcast (e.g., system, paging, random access channel (RACH) response, etc.). The common search space may also be used for unicast scheduling. For each decoding candidate, there are up to 2 distinct downlink control information (DCI) format sizes. Thus, there are up to 6×2=12 blind decodes.

Figure 7:
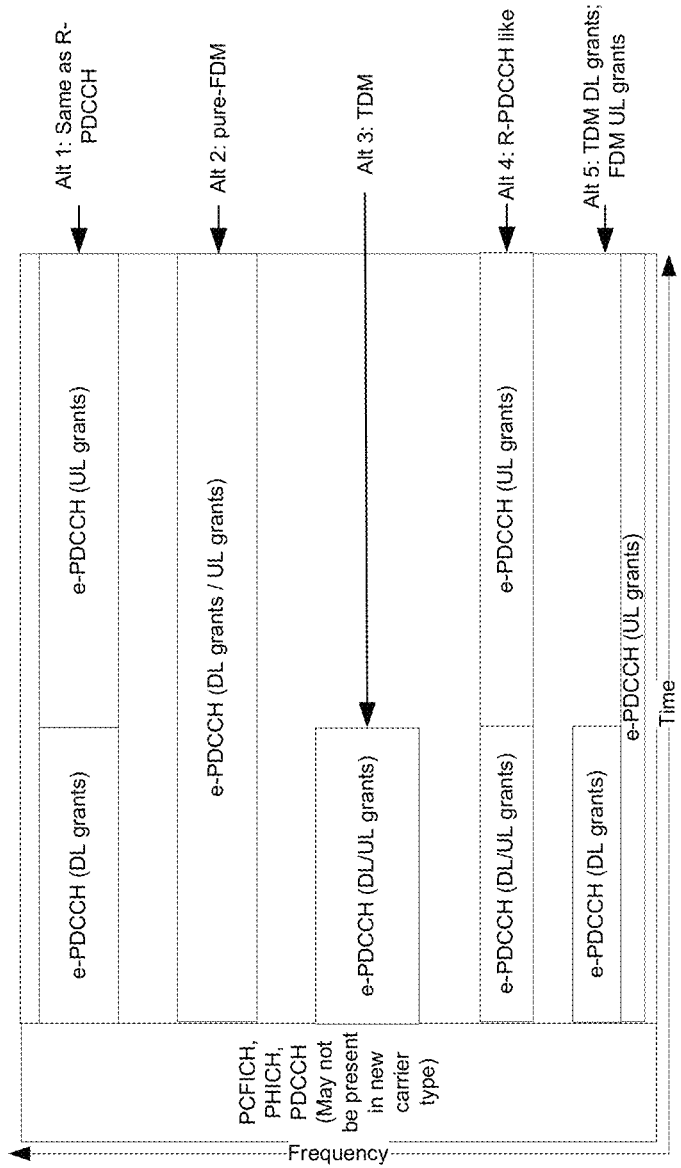
FIG. 7 is a diagram illustrating various EPDCCH structures.

FIG. 7 illustrates an example of various EPDCCH structures. For example, in one aspect, the EPDCCH structure may be the same as the relay physical downlink control channel (R-PDCCH) structure. Alternately, in another aspect, the EPDCCH may be pure-FDM (frequency division multiplexing). Optionally, in an alternate structure, the EPDCCH structure is all TDM. Alternately, the EPDCCH is similar to, but not the same as the relay physical downlink control channel (R-PDCCH). In still another alternate structure, the EPDCCH may combine TDM and FDM.

When the enhanced control channel is based on frequency division multiplexing (FDM), the enhanced control channel spans both the first and second slots. In some cases, there may be a restriction on the maximum number of transport channel (TrCH) bits receivable in a transmission time interval (TTI). A shared channel and an enhanced control channel may not be multiplexed within a physical resource block (PRB) pair.

In some configurations, both localized and distributed transmission are supported for EPDCCH. For localized transmission, and for distributed transmission, where the common reference signal (CRS) is not used for demodulation of the enhanced control channel, the demodulation of the enhanced control channel is based on the demodulation reference signal (DMRS). The DMRS is transmitted in the physical resource blocks (PRBs) used for the transmission of the enhanced control channel.

The UE can monitor for the EPDCCH on all subframes or a subset of subframes. The presence of EPDCCH may be subframe dependent. In particular, in subframes where a UE monitors the EPDCCH UE specific search space (UESS) on a given carrier, the UE does not monitor the PDCCH UE specific search space on the same carrier. The UE can be configured to monitor either localized, or distributed EPDCCH candidates in a given subframe. Additionally, the UE can monitor a common search space (CSS) for PDCCH. Alternatively, the UE may also monitor the common search space for EPDCCH if the UE determines (e.g., based on a carrier type, or based on some signaling) that the common search space exists on EPDCCH.

The UE can be configured to monitor both localized and distributed EPDCCH candidates in a given subframe. When the UE is configured to monitor both, the total number of UE specific search space blind decodes on the carrier is not increased.

The subframes where the UE does not monitor the EPDCCH UE specific search space may be predetermined. In particular, the EPDCCH may not be monitored by a UE for special subframe configurations 0 and 5 for normal cyclic prefix (CP), or configurations 0 and 4 for extended CP in a time-division duplex (TDD) system. In another aspect, a UE may be configured by higher layer signaling for the set of subframes for which the UE may monitor the EPDCCH. In another aspect, a UE may determine whether to monitor the EPDCCH in a subframe based on other implicit information. As an example, a UE may determine to monitor the EPDCCH in a subframe if the subframe is of a new carrier type. As another example, a UE may determine to monitor the EPDCCH in a subframe based on an indication in a broadcast message.

In subframes where the UE determines not to monitor the EPDCCH, the UE monitors the common search space (CSS) and UE specific search space on PDCCH pursuant to Release 10.

Another aspect of the disclosure is directed to physical multicast channel (PMCH) subframes. The PMCH carries the multicast channel (MCH) and may implement the option of multimedia broadcast over single frequency network (MBSFN) subframes when a UE receives the PMCH from cells operating in the same area on the same frequency band. LTE Release 10 permits two types of transmissions in MBSFN subframes. One type of transmission is for a multimedia broadcast multicast service (MBMS), where all or a subset of MBSFN subframes are determined by higher layers for physical multicast channel (PMCH) decoding. The other allowed type of transmission for MBSFN subframes supports unicast downlink transmissions, e.g., based on mode 9 and 10.

The determination of an MBSFN subframe for MBMS at a UE may not be completely known at the eNodeB. In particular, different UEs may subscribe to different MBMS services. As a result, the eNodeB and UE may be misaligned as to whether a MBSFN subframe is for PMCH.

Because the PMCH occupies the entire bandwidth, the PDSCH and PMCH are not supported in the same subframe. In one aspect, EPDCCH and PMCH may not be supported in the same subframe from a UE perspective.

The determination of PMCH subframes at a UE is not completely known by the eNodeB. As a result, the eNodeB may configure a subframe for EPDCCH when the UE has instead determined the same subframe is an MBMS subframe. In another aspect, a UE may determine to monitor EPDCCH in a subframe, and at the same time, determine that the subframe is also an MBMS subframe. One aspect of the present disclosure is directed to managing the potential collisions of these types at the UE side by avoiding handling of PMCH and EPDCCH in the same subframe.

One aspect of the present disclosure is directed to managing subframes by assigning a priority based on channel type. For example, in one aspect, EPDCCH is given a higher priority. If a UE is informed (e.g., based on a radio resource control (RRC) configuration) that a subframe may carry EPDCCH, then EPDCCH monitoring is assigned a higher priority. The UE will not proceed with PMCH reception in that subframe. Additionally, if the UE is configured with downlink transmission mode 9, mode 10 and/or any other demodulation reference signal (DM-RS) compatible modes, then the UE also processes the subframe as carrying the unicast PDSCH if it is scheduled. Additionally, the subframe is treated as a regular MBSFN subframe that is used for unicast without MBMS. That is, the cyclic prefix of the subframe may be determined based on the cyclic prefix of subframe 0. In additional, the PMCH reference signal (RS) may be assumed to be absent in the subframe. In other words, when EPDCCH is given a higher priority, the UE may determine an MBSFN subframe carrying PMCH only if the subframe is not configured as an EPDCCH subframe.

Optionally, in another aspect, the PMCH is assigned a higher priority. In this case, the UE does not monitor for EPDCCH, (even if the UE has determined that it is a subframe for EPDCCH monitoring). Instead, the UE proceeds with the PMCH reception. Additionally, in this scenario, the UE may instead monitor for the legacy PDCCH in this subframe. As an example, the UE may monitor for the legacy PDCCH for uplink grants, or downlink semi-persistent scheduling release in this subframe.

In another aspect, the priority is dependent on the transmit mode. For example, if the mode is a downlink mode 9, 10 and/or any future DM-RS compatible modes, then the EPDCCH is assigned the higher priority. Otherwise, the PMCH is given higher priority.

In another aspect, determining whether to process the PMCH or EPDCCH is based on UE implementation. The UE determines how to process the channels. In particular, the UE may choose to process the PMCH, EPDCCH, or both (e.g., processing the EPDCCH first, followed by the PMCH).

In another aspect, determining whether to process the PMCH or EPDCCH is dependent upon whether a subframe is determined as an EPDCCH subframe via an explicit signaling or an implicit determination. As an example, if a UE receives an explicit indication that a subframe is an EPDCCH subframe, then the EPDCCH is given a higher priority. If the UE determines a subframe is an EPDCCH subframe in an implicit manner (e.g., based on a carrier type), then the PMCH may be given a higher priority. As another example, if a UE does not receive an explicit indication that a subframe is an EPDCCH subframe, a UE may determine whether a subframe could contain a PMCH first. If the UE determines the subframe is a PMCH subframe, it will not monitor for the EPDCCH in the subframe and may monitor for the legacy PDCCH instead. Otherwise (if it determines that it is not a PMCH subframe), the UE may determine that it is an EPDCCH subframe.

In another aspect, determining whether to process PMCH or EPDCCH is dependent upon whether the EPDCCH is within a common search space. As an example, if the EPDCCH is within a common search space, the UE may determine that it is an EPDCCH subframe. If the EPDCCH is not within the common search space, the UE may determine that it is a PMCH subframe.

Although the previous discussion was discussed with respect to processing EPDCCH or PMCH, the concepts could also apply to conflicts between the EPDCCH and a signal of a service in a subframe. The signal of the service may include, for example, a positioning reference signal (PRS). In LTE, the PRS is transmitted on antenna port 6. The PRSs are transmitted in resource blocks in downlink subframes that are configured for positioning reference signal transmission. From the various concepts discussed above, the UE may determine whether a subframe is a positioning subframe or a EPDCCH subframe.

Another aspect of the present disclosure is directed to indicating, to a UE, a starting symbol of the EPDCCH in a subframe. The starting symbol of the EPDCCH may be determined by decoding the physical control format indicator channel (PCFICH) at least in some subframes or at least for some UEs. In one aspect, the starting symbol of the EPDCCH may be combined with the decoding of the physical hybrid automatic repeat request indicator channel (PHICH), as in LTE Release 8. For example, if the PHICH duration is extended, the control region size is at least 3 (non-MBSFN subframes) or fixed at 2 (MBSFN subframes) symbols. The PCFICH detection can be omitted at the UE side. If the PHICH duration is normal, the control region size can be 1-4 symbols (for non-MBSFN subframes) or 1-2 symbols (for MBSFN subframes). The starting symbol of the EPDCCH is then the symbol after the control region. Additionally, the starting symbol of the EPDCCH can be determined by the control region size.

In one aspect, the starting symbol of the EPDCCH is placed one or more symbols later than the end of the control region. For example, if the neighboring cell has a control region size of 3 symbols, while the serving cell has a control region size of 2 symbols as indicated by the PCFICH, then the EPDCCH of the serving cell may start from the 4th symbol, instead of the 3rd symbol.

In one aspect, a UE receives an indication that the starting symbol of the EPDCCH is one or more symbols later than the end of the control region. As an example, the indication can be via the PCFICH. In one aspect, the received indication does not impact legacy UEs. If legacy and new UEs coexist in the same subframe, the PHICH may be configured to indicate an "extended" duration, allowing legacy UEs to omit PCFICH detection. In one aspect, the legacy UEs rely on PHICH to determine the legacy control region size.

For new UEs, PCFICH is assigned a higher priority compared with the PHICH indicating the extended duration.

The PCFICH value may indicate a value different from the one implied by the PHICH. For example, if the subframe is a MBSFN subframe, and the PHICH indicates the extended duration, then the PHICH implies 2 symbols for the control region. A PCFICH may be transmitted indicating 3 or 4 symbols to tell the UE configured with EPDCCH to start EPDCCH from the 4th or 5th symbol.

In another scenario, a revised PCFICH value is transmitted in subframes where legacy UEs are not scheduled, i.e., in different subframes. Optionally, PCFICH may also be transmitted, indicating a value not supported, for example, in Release 8 (e.g., MBSFN subframes indicating 3 or 4 control symbols).

Figure 8:
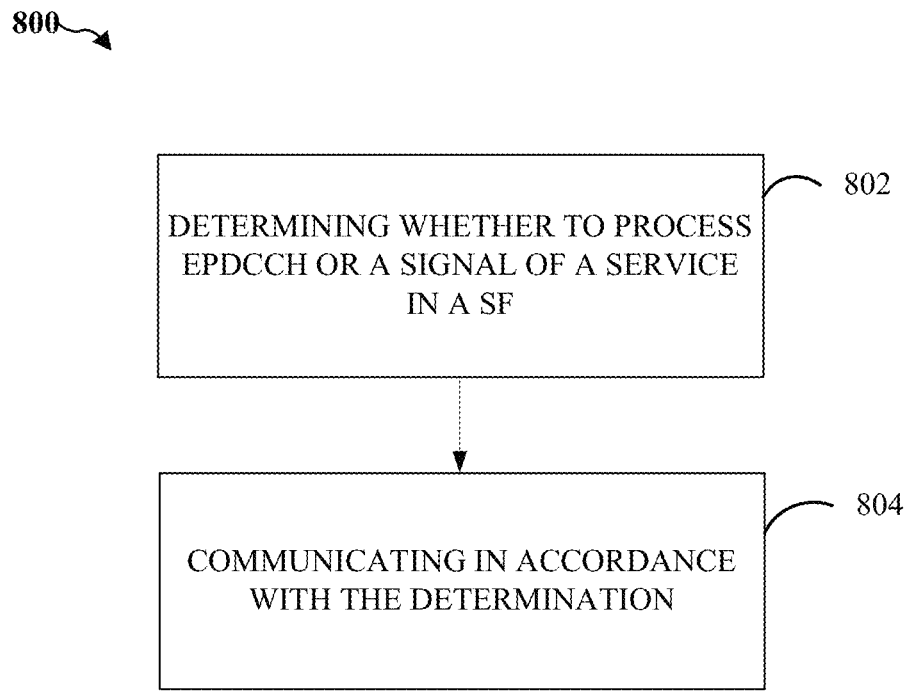
FIG. 8 is a block diagram illustrating a method for processing PMCH and EPDCCH, according to aspects of the present disclosure.

FIG. 8 illustrates a method 800 for processing a signal of a service (e.g., PMCH or PRS) and EPDCCH in LTE. In block 802, the UE determines whether to process the EPDCCH or a signal of the service in a subframe. The determination may be based on various factors and/or conditions discussed in detail above. In block 804, the UE communicates in accordance with the determination.

In one configuration, the UE 650 is configured for wireless communication including means for determining. In one aspect, the determining means may be the controller/processor 659 and/or memory 660 configured to perform the functions recited by the determining means. The UE 650 is also configured to include a means for communicating. In one aspect, the communicating means may be the antenna 652, receivers/transmitters 654, TX processor 668, RX processor 656, controller/processor 659 and/or memory 660 configured to perform the functions recited by the communicating means. In another aspect, the aforementioned means may be any module or any apparatus configured to perform the functions recited by the aforementioned means.

Figure 9:
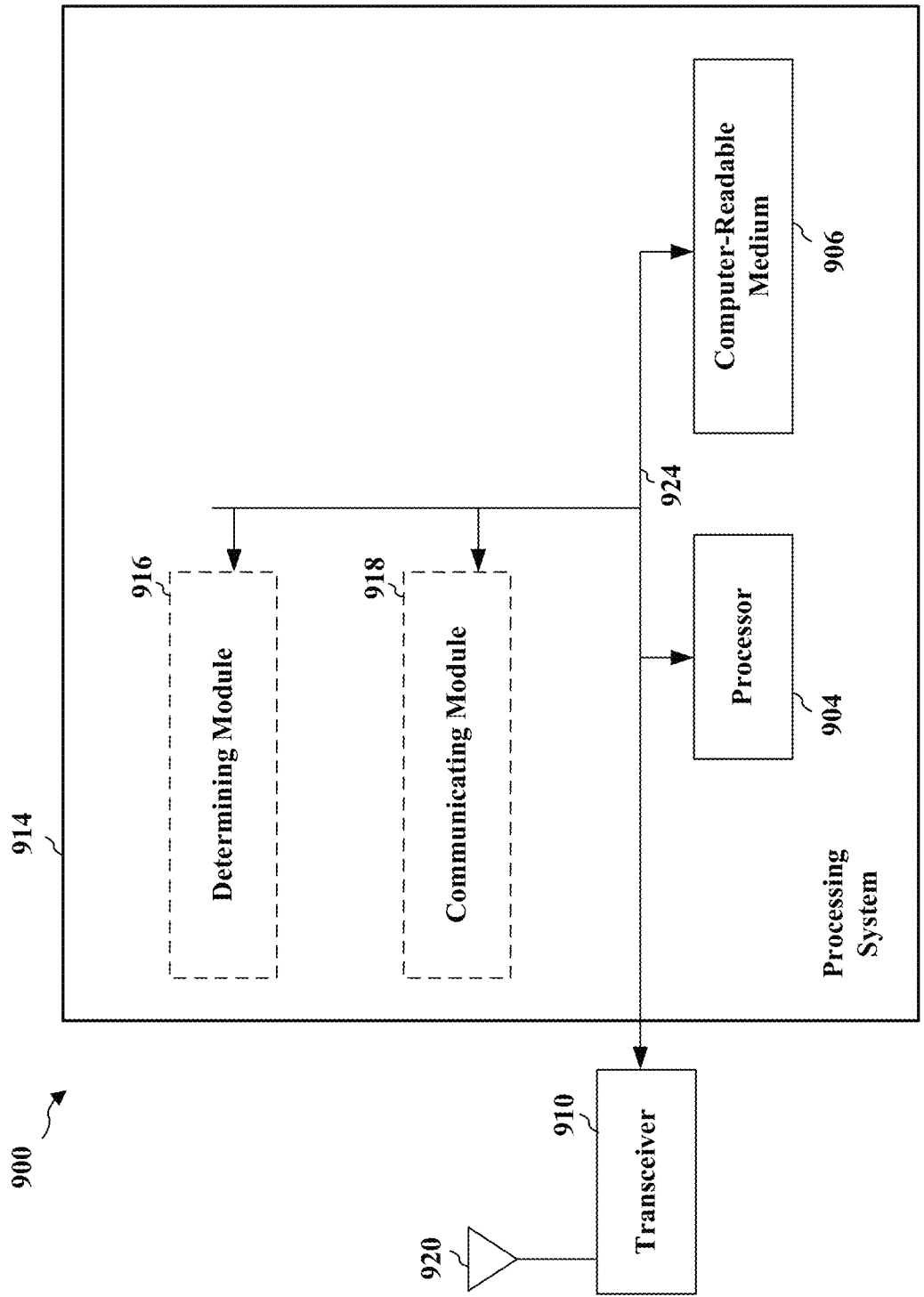
FIG. 9 is a conceptual data flow diagram illustrating an exemplary data flow between different modules/means/components in an exemplary apparatus.

FIG. 9 is a diagram illustrating an example of a hardware implementation for an apparatus 900 employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware modules, represented by the processor 904, the modules 916, 918 and the computer-readable medium 906. The bus 924 may also link various other circuits such as timing sources, peripherals, voltage regulators, and power management circuits, which are well known in the art, and therefore, will not be described any further.

The apparatus includes a processing system 914 coupled to a transceiver 910. The transceiver 910 is coupled to one or more antennas 920. The transceiver 910 enables communicating with various other apparatus over a transmission medium. The processing system 914 includes a processor 904 coupled to a computer-readable medium 906. The processor 904 is responsible for general processing, including the execution of software stored on the computer-readable medium 906. The software, when executed by the processor 904, causes the processing system 914 to perform the various functions described for any particular apparatus. The computer-readable medium 906 may also be used for storing data that is manipulated by the processor 904 when executing software.

The processing system includes a determining module 916 and a communicating module 918. The determining module can determine whether to process EPDCCH or a signal of a service in a subframe. The communicating module can communicate in accordance with the determination. The modules may be software modules running in the processor 904, resident/stored in the computer readable medium 906, one or more hardware modules coupled to the processor 904, or some combination thereof. The processing system 914 may be a component of the UE 650 and may include the memory 660 and/or the controller/processor 659.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving signaling indicating that a subframe is configured for physical multicast channel (PMCH) monitoring;
   determining, at a user equipment (UE), that the subframe is configured for enhanced physical downlink control channel (EPDCCH) monitoring in a UE specific search space after determining that the subframe is configured for PMCH monitoring, the UE configured for legacy physical downlink control channel (PDCCH) monitoring in a common search space;
   determining that a PMCH has a higher priority than an EPDCCH in the subframe configured for PMCH monitoring;
   monitoring the subframe for the PMCH instead of the EPDCCH in response to the higher priority;
   monitoring the subframe for a PDCCH in the UE specific search space instead of the EPDCCH in response to monitoring the subframe for the PMCH instead of the EPDCCH; and
   decoding the PMCH received in the subframe.

2. The method of claim 1, further comprising monitoring the legacy PDCCH for at least one of an uplink grant or a downlink semi-persistent scheduling release.

3. The method of claim 1, in which the subframe is configured as an EPDCCH subframe via a radio resource control (RRC) configuration.

4. The method of claim 1, in which the subframe is determined as an EPDCCH subframe via at least one implicit indication.

5. The method of claim 4, in which the implicit indication consists of a carrier type.

6. The method of claim 1, further comprising determining whether the subframe is an EPDCCH subframe via explicit signaling or implicit information.

7. The method of claim 1, in which the PDCCH is monitored in both the common search space and the UE specific search space in response to monitoring the subframe for the PMCH instead of the EPDCCH.

8. An apparatus for wireless communication, comprising:
   a memory; and
   at least one processor coupled to the memory, the at least one processor being configured:
      to receive signaling indicating that a subframe is configured for physical multicast channel (PMCH) monitoring;
      to determine, at a user equipment (UE), that the subframe is configured for enhanced physical downlink control channel (EPDCCH) monitoring in a UE specific search space after determining that the subframe is configured for PMCH monitoring, the UE configured for legacy physical downlink control channel (PDCCH) monitoring in a common search space;
      to determine that a PMCH has a higher priority than an EPDCCH in the subframe configured for PMCH monitoring;
      to monitor the subframe for the PMCH instead of the EPDCCH in response to the higher priority;
      to monitor the subframe for a PDCCH in the UE specific search space instead of the EPDCCH in response to monitoring the subframe for the PMCH instead of the EPDCCH; and
      to decode the PMCH received in the subframe.

9. The apparatus of claim 8, in which the at least one processor is further configured to monitor the legacy PDCCH for at least one of an uplink grant or a downlink semi-persistent scheduling release.

10. The apparatus of claim 8, in which the subframe is configured as an EPDCCH subframe via a radio resource control (RRC) configuration.

11. The apparatus of claim 8, in which the subframe is determined as an EPDCCH subframe via at least one implicit indication.

12. The apparatus of claim 11, in which the implicit indication consists of a carrier type.

13. The apparatus of claim 8, in which the at least one processor is configured to determine whether the subframe is an EPDCCH subframe via explicit signaling or implicit information.

14. The apparatus of claim 8, in which the PDCCH is monitored in both the common search space and the UE specific search space in response to monitoring the subframe for the PMCH instead of the EPDCCH.

15. A non-transitory computer-readable medium having program code recorded thereon, the program code comprising:
   program code to receive signaling indicating that a subframe is configured for physical multicast channel (PMCH) monitoring;
   program code to determine, at a user equipment (UE), that the subframe is configured for enhanced physical downlink control channel (EPDCCH) monitoring in a UE specific search space after determining that the subframe is configured for PMCH monitoring, the UE configured for legacy physical downlink control channel (PDCCH) monitoring in a common search space;
   program code to determine that a PMCH has a higher priority than an EPDCCH in the subframe configured for PMCH monitoring;
   program code to monitor the subframe for the PMCH instead of the EPDCCH in response to the higher priority;
   program code to monitor the subframe for a PDCCH in the UE specific search space instead of the EPDCCH in response to monitoring the subframe for the PMCH instead of the EPDCCH; and program code to decode the PMCH received in the subframe.

16. The non-transitory computer-readable medium of claim 15, in which the program code further comprises program code to monitor the legacy PDCCH for at least one of an uplink grant or a downlink semi-persistent scheduling release.

17. The non-transitory computer-readable medium of claim 15, in which the subframe is configured as an EPDCCH subframe via a radio resource control (RRC) configuration.

18. The non-transitory computer-readable medium of claim 15, in which the subframe is determined as an EPDCCH subframe via at least one implicit indication.

19. The non-transitory computer-readable medium of claim 18, in which the implicit indication consists of a carrier type.

20. The non-transitory computer-readable medium of claim 15, in which the program code further comprises program code to determine whether the subframe is an EPDCCH subframe via explicit signaling or implicit information.

21. The non-transitory computer-readable medium of claim 15, in which the PDCCH is monitored in both the common search space and the UE specific search space in response to monitoring the subframe for the PMCH instead of the EPDCCH.

22. An apparatus for wireless communication, comprising:

means for receiving signaling indicating that a subframe is configured for physical multicast channel (PMCH) monitoring;

means for determining, at a user equipment (UE), that the subframe is configured for enhanced physical downlink control channel (EPDCCH) monitoring in a UE specific search space after determining that the subframe is configured for PMCH monitoring, the UE configured for legacy physical downlink control channel (PDCCH) monitoring in a common search space;

means for determining that a PMCH has a higher priority than an EPDCCH in the subframe configured for PMCH monitoring;

means for monitoring the subframe for the PMCH instead of the EPDCCH in response to the higher priority;

means for monitoring the subframe for a PDCCH in the UE specific search space instead of the EPDCCH in response to monitoring the subframe for the PMCH instead of the EPDCCH; and means for decoding the PMCH received in the subframe.

23. The apparatus of claim 22, further comprising means for monitoring the legacy PDCCH for at least one of an uplink grant or a downlink semi-persistent scheduling release.

24. The apparatus of claim 22, in which the subframe is determined as an EPDCCH subframe via a radio resource control (RRC) configuration.

25. The apparatus of claim 22, in which the subframe is determined as an EPDCCH subframe via at least one implicit indication.

26. The apparatus of claim 25, in which the implicit indication consists of a carrier type.

27. The apparatus of claim 22, further comprising means for determining whether the subframe is an EPDCCH subframe via explicit signaling or implicit information.

28. The apparatus of claim 22, in which the PDCCH is monitored in both the common search space and the UE specific search space in response to monitoring the subframe for the PMCH instead of the EPDCCH.

* * * * *